United States Patent [19]
Kanayama

[11] Patent Number: 4,581,946
[45] Date of Patent: Apr. 15, 1986

[54] INSTRUMENTAL ERROR COMPENSATION CIRCUIT FOR FLOW METER

[76] Inventor: Masahiro Kanayama, c/o Oval Engineering Co., Ltd., 10-8, Kamiochiai 3-chome, Shinjuku-ku, Tokyo, Japan

[21] Appl. No.: 505,525

[22] Filed: Jun. 17, 1983

[30] Foreign Application Priority Data

Jun. 21, 1982 [JP] Japan .............................. 57-105370

[51] Int. Cl.⁴ .............................................. G01F 1/12
[52] U.S. Cl. .............................. 73/861.77; 73/861.83; 364/510
[58] Field of Search .......... 73/861.02, 861.03, 861.77, 73/861.78, 861.81, 861.83; 364/510; 377/21

[56] References Cited

U.S. PATENT DOCUMENTS

| | | | |
|---|---|---|---|
| 3,945,253 | 3/1976 | Liu et al. | 73/861.83 |
| 3,965,341 | 6/1976 | Honey et al. | 73/861.77 |
| 4,306,457 | 12/1981 | Fukui et al. | 73/861.77 |

Primary Examiner—Herbert Goldstein
Attorney, Agent, or Firm—Jordan and Hamburg

[57] ABSTRACT

An instrumental error compensation circuit for a flow meter is disclosed in which a flow rate calculated from an output signal of the flow meter is identified with respect to a plurality of predetermined sections of flow rates. Flow rate compensation coefficients are calculated by linear interpolation on the basis of actually measured data which are obtained in advance in accordance with instrumental errors of the flow meter. Actual flow rates of a fluid are measured with the instrumental errors of the flow meter compensated for by the calculated coefficients.

6 Claims, 3 Drawing Figures

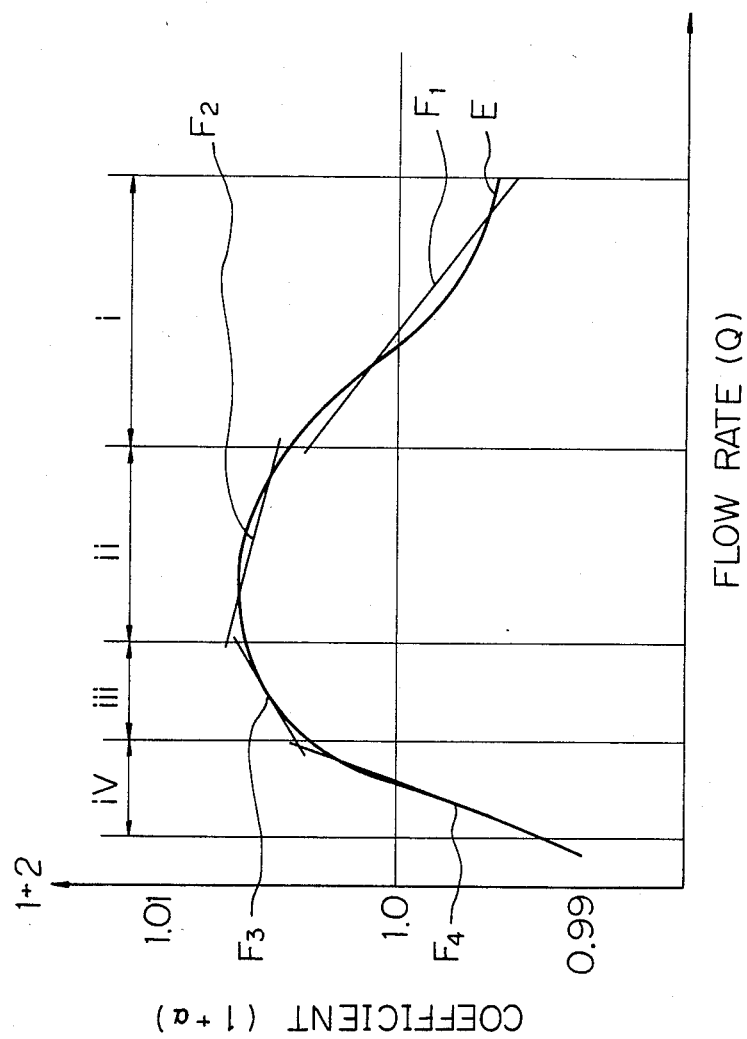

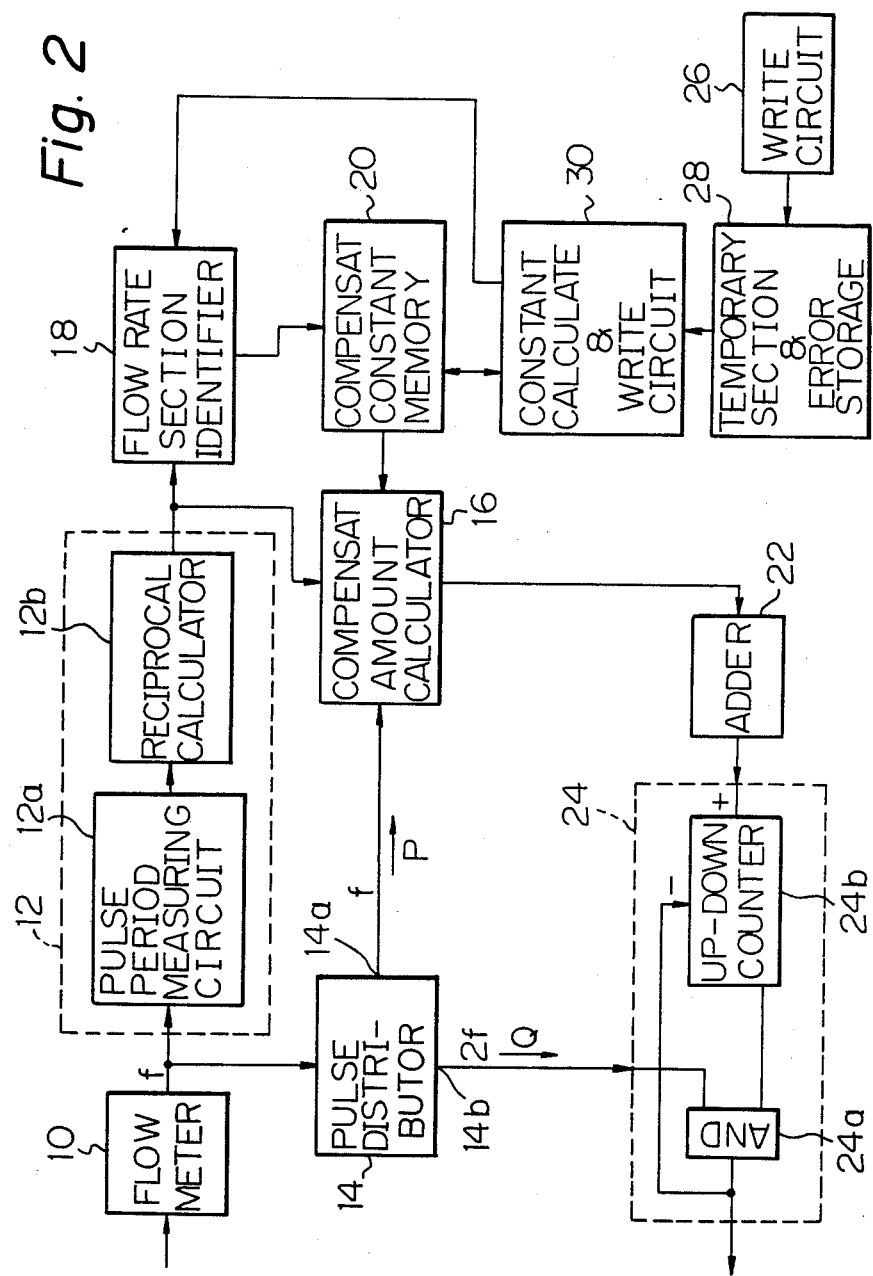

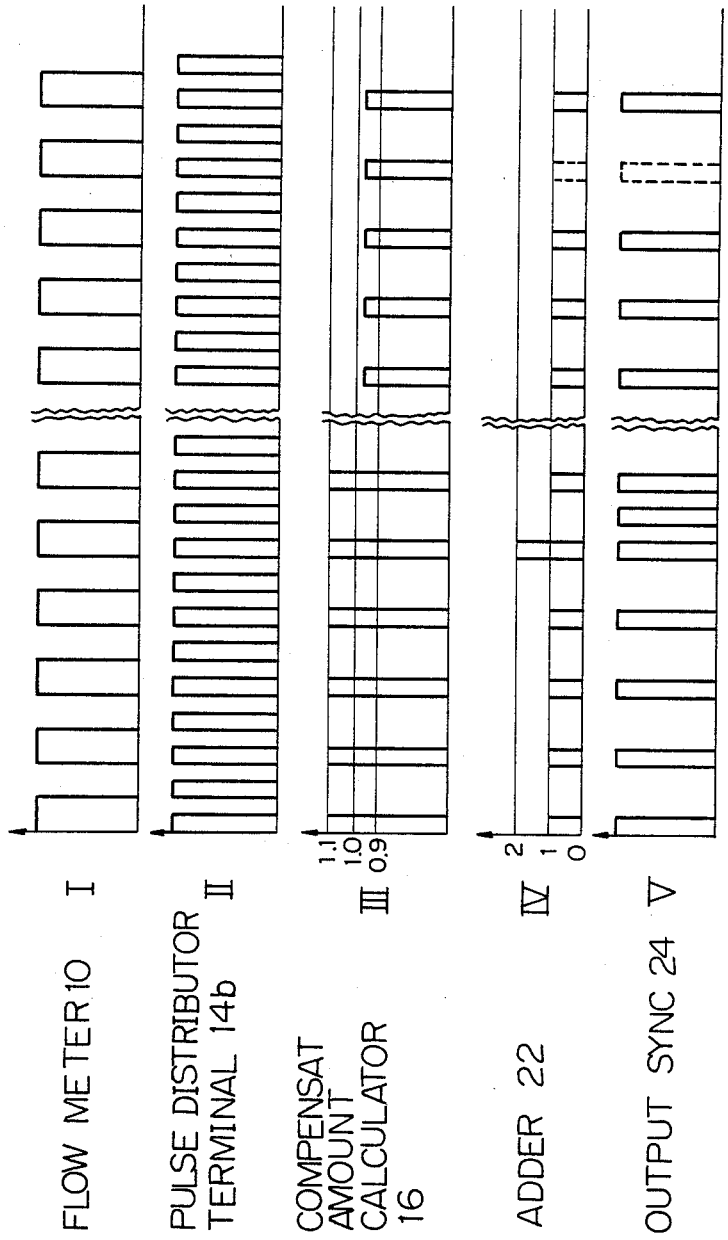

INSTRUMENTAL ERROR COMPENSATION CIRCUIT FOR FLOW METER

BACKGROUND OF THE INVENTION

The present invention relates to a circuit for compensating for instrumental errors of a flow meter.

In a flow meter, an instrumental error has to be compensated for by using a compensation coefficient or the like so that measurement of a flow rate of a fluid may give a true volume.

Supposing that an instrumental error is E, a displayed volume is Vi, a volume actually flown is Vq, and a compensation coefficient is $(1+\alpha)$, there holds an equation:

$$E = \frac{Vi - Vq}{Vi} \times 100(\%) \qquad \text{Eq. (1)}$$

or $$Vq = (1+\alpha) \cdot Vi \qquad \text{Eq. (2)}$$

The instrumental error E, which is a function of the flow rate Q, cannot be reduced beyond a certain limit by a mechanical means but may be successfully reduced to a negligible value if use is made of an electronic means. The electronic means for such an application has heretofore been proposed in various forms.

One of the proposed electronic means is applied to a flow meter of the type wherein a pickup coil or the like senses rotations of a rotor which is rotated by a fluid flowing through the flow meter, the rotations being converted into electric pulses. The error reducing means is constructed to vary the pulse rate of detected pulses in order that an error curve may undergo a parallel shift within a certain range of flow rates Q to bring the errors closer to zero in an average sense. However, it is difficult for such a prior art implementation to approximate the errors to zero over the entire range of flow rates.

In light of this, there has been proposed a system in which a plurality of sections are defined within an operable range of a flow meter and a ROM or like memory stores error compensation amounts matched to the individual sections. The parallel shift of the error curve in this system occurs over a width which differs from one section to another. This system, however, suffers from the drawback that because a single compensation amount is assigned to each compensation section, the error reaches a critical value unless the range is fractionalized into a number of sections and, therefore, without a memory having a disproportionate capacity.

SUMMARY OF THE INVENTION

It is therefore an object of the present invention to provide an instrumental error compensation circuit for a flow meter which insures a desirable accuracy of compensation even though each compensation section may be wide, by calculating compensation amounts in different compensation sections in correspondence to flow rates by linear interpolation.

It is another object of the present invention to provide a generally improved instrumental error compensation circuit for a flow meter.

A circuit for compensating for an instrumental error of a flow meter which generates a pulse signal having a frequency proportional to a flow rate of the present invention includes a pulse distributor for generating two different pulse signals in response to the pulse signal output from the flow meter. The two pulse signals have a predetermined frequency ratio to each other. A flow rate calculator calculates an instantaneous flow rate based on the frequency of the output signal of the flow meter and generates an output signal indicative of the instantaneous flow rate. A flow rate section identifier identifies, in response to the output signal of the flow rate calculator specific one of predetermined flow rate sections to which the calculated instantaneous flow rate belongs, and generates a signal indicative of the identified section. A compensation constant memory stores in advance a plurality of compensation constants necessary for calculating an instrumental error of the flow meter for each of the sections, selects specific one of the compensation constants in response to the output signal of the identifier, and generates a signal indicative of the compensation constant. A compensation constant calculate and write circuit calculates a compensation coefficient in response to the output signal of the compensation constant memory by performing interpolation corresponding to a flow rate, and generates a signal indicative of the compensation coefficient. A compensation amount calculator calculates an amount of compensation corresponding to the output signal of the compensation constant calculate and write circuit in sychronism with one of the pulse signals output from the pulse distributor, and generates a signal indicative of the amount of compensation. An adder means adds up the output signals of the compensation amount calculator and, every time the sum reaches a predetermined numerical value, generates an overflow pulse signal as a compensated flow rate pulse. An output sync circuit synchronizes the output pulse signal of the adder to the other output signal of the pulse distributor to generate a sync signal.

In accordance with the present invention, an instrumental error compensation circuit for a flow meter is disclosed in which a flow rate obtained from one output signal of the flow meter is identified with respect to a plurality of predetermined sections of flow rates. Flow rate compensation coefficients are calculated by linear interpolation on the basis of actually measured data which are obtained in advance in accordance with instrumental errors of the flow meter. Actual flow rates of a fluid are measured with the instrumental errors of the flow meter compensated for by the calculated coefficients.

The above and other objects, features and advantages of the present invention will become apparent from the following detailed description taken with the accompanying drawings.

BRIEF DESCRIPTION OF THE DRAWINGS

FIG. 1 is a graph representing the principle of operation of an instrumental error compensation circuit in accordance with the present invention;

FIG. 2 is a block diagram of an instrumental error compensation circuit embodying the present invention; and FIG. 3 is a waveform diagram showing pulses which appear in various parts of the circuit shown in FIG. 2.

DESCRIPTION OF THE PREFERRED EMBODIMENTS

While the instrumental error compensation circuit for a flow meter of the present invention is susceptible of numerous physical embodiments, depending upon the environment and requirements of use, a substantial number of the herein shown and described embodiment have been made, tested and used, and all have performed in an eminently satisfactory manner.

Referring to FIG. 1 of the drawings, the graph shows flow rates Q along its abscissa and compensation coefficients $(1+\alpha)$ along its ordinate. A curve E represents a flow rate to compensation coefficient characteristic and may be represented by lines $F_1$, $F_2$, $F_3$ and $F_4$ in discrete compensation sections by approximation.

When a flow rate Q is calculated, specific one of the compensation sections i, ii, iii and iv to which the flow rate Q belongs is identified. Thereafter, based on data $A_n$ and $B_n$ which were computed in advance using instrumental errors of flow rates Q, a compensation coefficient is determined for the specific section by linear interpolation. That is, a compensation coefficient $(1+\alpha)$ is calculated in a section in which an instantaneous flow rate Q lies, using corresponding one of the equations:

| | | |
|---|---|---|
| section i | $A_1 \cdot Q + B_1 = 1 + \alpha_1$ | Eq. (3-i) |
| section ii | $A_2 \cdot Q + B_2 = 1 + \alpha_2$ | Eq. (3-ii) |
| section iii | $A_3 \cdot Q + B_3 = 1 + \alpha_3$ | Eq. (3-iii) |
| section iv | $A_4 \cdot Q + B_4 = 1 + \alpha_4$ | Eq. (3-iv) |

The calculated coefficient $(1+\alpha)$ is used for compensating for an error. The data $A_n$ and $B_n$ are obtained from actually measured instrumental errors by a method of least squares or like method of tolerance.

Reference will be made to FIGS. 2 and 3 for describing a practical construction and operation of the instrumental error compensation circuit of the present invention.

A flow meter 10 generates flow rate pulses having a frequency f which is proportional to a flow rate. The flow rate pulses are delivered to a flow rate calculator 12 and, via a low frequency output terminal 14a of a pulse distributor 14, to a compensation amount calculator 16. While pulses P appearing at the low frequency output terminal 14a of the pulse distributor 14 are common in frequency (f) to the incoming flow rate pulses, pulses Q appearing at the other or high frequency output terminal 14b have a frequency double the frequency f, 2f.

The flow rate calculator 12 includes a pulse period measuring circuit 12a for measuring a period of the flow rate pulse signal. The circuit 12a connects to a reciprocal calculator 12b which is adapted to obtain a reciprocal of the period of the pulse signal, i.e. a flow rate. The flow rate is fed from the calculator 12b to a flow rate section identifier circuit 18 which identifies specific one of the predetermined compensation sections to which the input flow rate belongs.

A compensation constant memory 20 which may be constituted by a ROM or like known memory stores compensation amount data which were calculated in advance for the individual flow rate sections on the basis of an instrumental error of the flow meter. In response to an output of the section identifier 18, the memory 20 produces a compensation value associated with the input and this value is loaded in the compensation amount calculator 16. Every time a pulse P is delivered from the terminal 14a of the pulse distributor 14 to the compensation amount calculator 16, the latter calculates a compensation value $(1+\alpha)$ based on the output data of the memory 20 and using corresponding one of the Eqs. (3-i) to (3-iv). The output of the calculator 16 is fed to an adder 22. The calculator 16 may be constituted by the circuit a shown in FIG. 1 of Japanese Utility Model Publication No. 51-9895.

The adder 22 adds up the sequential outputs of the compensation amount calculator 16 and, before the sum reaches "1 (one)", delivers no pulses therefrom. Upon the increase of the sum to "1", the adder 22 overflows to supply an output sync circuit 24 with a pulse. Describing it more concretely, pulses P having a frequency f proportioanl to a flow rate appear at the output terminal 14a of the pulse distributor 14, while pulses Q whose frequency is double the frequency of the pulses P appear at the output terminal 14b. Each time a pulse P appears, the calculator 16 provides a compensation value $(1+\alpha)$ in response to an output of the memory 20 and using one of the Eqs. (3-i) to (3-iv). The output of the calculator 16 is fed to the adder 22. The adder 22, every time a pulse P is produced, adds up an incoming compensation value $(1+\alpha)$. As soon as the sum increases to "1", the adder 22 overflows and produces a numerical value "1". Upon the increase of the sum to "2", the adder 22 will produce a numerical value "2".

The output sync circuit 24 comprises an AND gate 24a and an up-down counter 24b. The AND gate 24a receives at one input terminal thereof the pulses Q which are output from the terminal 14b of the pulse distributor 14 with a frequency double the frequency of the pulses P. The up-down counter 24b receives at its addition input terminal the overflow pulses which are output from the adder 22. The output of the AND gate 24b is fed back to the other or subtraction input terminal of the up-down counter 24b.

Because a correction value $(1+\alpha)$ is integrated by the adder 22 for each output pulse of the flow meter 10, the pulses from the flow meter 10 and output pulses of the adder 22 are eventually N $(1+\alpha)$ pulses. While this provides compensated correct flow rate pulses as far as the number is concerned, a problem still exists concerning density of the pulses with respect to time. Thus, the output sync circuit 24 serves to set up synchronization for evenness. In detail, the outputs of the adder 22 are once accumulated in the up-down counter 24b and, as the count reaches "1", the counter 24b makes its output logical "1" thereby providing an output which is synchronous with a pulse appearing at the terminal 14b of the pulse distributor 14. If the count of the counter 14b is "0", the output thereof will be logical "0" so that no outputs are produced by the AND gate 24a.

In FIG. 3, I shows a train of pulses output from the flow meter 10, II a train of pulses appearing at the output terminal 14b of the pulse distributor 14, III numerical values output from the compensation amount calculator 16, IV a train of pulses output from the adder 22, and V a train of compensated pulses output from the output sync circuit 24.

Where $|\alpha|<1$, the adder 22 produces overflow pulses substantially one for each output pulse of the flow meter 10, as shown in FIG. 3. Where $(1+\alpha)>1$, the output of the adder 22 becomes "2" at the ratio of $1:\alpha$ as shown in the left half of FIG. 3 and the output sync circuit 24 delivers one additional pulse. Further, if $(1+\alpha)<1$, one overflow pulse is lost at the same ratio and, as shown in the right half of FIG. 3, one of the outputs of the output sync circuit 22 is lost.

Data in the section identifier 18 and those in the memory 20 corresponding to outputs of the identifier 18 may be suitably entered through keys associated with a write circuit 26 via a temporary flow rate section and error storage 28, a compensation constant calculate and write circuit 30 which may be constituted by any known device. That is, when the keys are operated to enter actually measured error data for the respective flow rates, the data become stored in the temporary storage 28 whereupon the calculate and write circuit 30 calculates flow rate sections necessary to perform compensation with a predetermined accuracy and values An and Bn for each of the sections. The values provided by the circuit 30 are loaded in the section identifier 18.

In summary, it will be seen that the present invention provides an instrumental error compensation apparatus which is operable with accuracy and with wide compensation sections due to the compensation amounts which are calculated by interpolation for individaul flow rates.

Various modifications will become possible for those skilled in the art after receiving the teachings of the present disclosure without departing from the scope thereof. For example, the write circuit 26 with keys may be substituted for by a read only memory (ROM) which stores necessary data and is replacable with another. Concerning the ratio of the output frequencies at the output terminals 14a and 14b of the pulse distributor 14, the requisite is merely to make the pulses appearing at the terminal 14b higher in frequency than those appearing at the output terminal of the adder 22 and, hence, the ratio of 1:2 shown and described is not restrictive. For example, if the compensation amount $(1+\alpha)$ output from the calculator 16 is preselected to be smaller than one, the output ratio of the pulse distributor 14 may be 1:1; if the flow meter 10 oscillating pulses at a frequency proportional to a flow rate is conditioned to employ n pulses to represent a unit amount, another ratio may be selected in which case the output of the calculator 16 may be $(1+\alpha)/n$. The adder 22 may comprise a preset counter. The sections of flow rates may be replaced by those of pulse periods or those of frequencies, if desired. Furthermore, the illustrated constructions such as one of the output sync circuit 24 may be suitably modified within the scope of the invention.

What is claimed is:

1. A circuit for compensating for an instrumental error of a flow meter which generates a pulse signal having a frequency proportional to a flow rate, said circuit comprising:
   pulse distributor means for generating two different pulse signals in response to the pulse signal output from the flow meter, said two pulse signals having a predetermined frequency ratio to each other;
   flow rate calculator means for calculating an instantaneous flow rate based on the frequency of the outer signal of the flow meter and generating an output signal indicative of said instantaneous flow rate;
   flow rate section identifier means for identifying, in response to the output signal of the flow rate calculator means, specific one of predetermined flow rate sections to which the calculated instantaneous flow rate belongs, and generating a signal indicative of the identified section;
   compensation constant memory means for storing in advance a plurality of compensation constants necessary for calculating an instrumental error of the flow meter for each of the sections, selecting specific one of the compensation constants in response to the output signal of the identifier means, and generating a signal indicative of said compensation constant;
   compensation constant calculate and write circuit means for calculating a compensation coefficient in response to the output signal of the compensation constant memory means by performing interpolation corresponding to a flow rate, and generating a signal indicative of the compensation coefficient;
   compensation amount calculator means for calculating an amount of compensation corresponding to the output signal of the compensation constant calculate and write circuit means in synchronism with one of the pulse signals output from the pulse distributor means, and generating a signal indicative of said amount of compensation, said compensation constant memory means, in response to an output of said flow rate section identifier means, producing a compensation value associated with the input, said compensation value being loaded into said compensation amount calculator means such that each time a pulse signal is delivered from said pulse distributing means to said compensation amount calculator means, said compensation amount calculator means calculates a compensation value based on the output data of said compensation constant memory means;
   adder means for adding up the output signals of the compensation amount calculator means, and every time the sum reaches a predetermined numerical value, generating an overflow pulse signal as a compensated flow rate pulse;
   output sync circuit means for sumchronizing the output pulse signal of the adder means to said other output signal of the pulse distributor means to generate a sync signal;
   a write circuit means for entering data in said flow rate section identifier means and data in said compensation constant memory means corresponding to outputs of said flow rate section identifier means; and
   temporary flow rate section means for temporarily storing said entered data such that said data is received by said compensation constant calculate and write circuit means via said temporary flow rate sections means, whereby said compensation constant calculate and write circuit means performs said calculations.

2. A circuit as claimed in claim 1, in which the ratio in frequency of said other output pulse signal of the pulse distributor means fed to the output sync circuit means to said one output pulse signal fed to the compensation amount calculator means is 2:1.

3. A circuit as claimed in claim 1, in which the output sync circuit means comprises an up-down counter which accumulates the overflow pulse signals output from the adder means and generates a logical "1" output signal only when a count is not zero, an AND gate to which an output signal of said up-down counter and said other output signal of the pulse distributor means are supplied, and a circuit for delivering an output signal of said AND gate to a subtraction input terminal of the up-down counter.

4. A circuit as claimed in claim 1, further comprising data input means for entering and temporarily storing instrumental error data on the flow meter for each of actually measured flow rates, calculating compensation values for the individual flow rate sections, and loading the calculated values in the identifier means.

5. A circuit as claimed in claim 4, in which the data input means comprises keys for writing data.

6. A circuit as claimed in claim 4, in which the data input means comprises a read only memory.

* * * * *